Patented May 3, 1949

2,468,869

UNITED STATES PATENT OFFICE 2,468,869

ORGANOSILICON COMPOSITIONS AND METHODS OF MAKING THEM

William Herbert Daudt, Corning, N. Y., assignor to Corning Glass Works, Corning, N. Y., a corporation of New York No Drawing. Application February 15, 1946, Serial No. 648,001

5 Claims. (Cl. 260—448.2)

This invention relates to new compositions of matter and their preparation and, more particularly, to new organosilicon compositions and methods of making them.

This invention is particularly concerned with polymeric organosilicon compositions known as dimethyl silicones. These silicones may be prepared by the hydrolysis of hydrolyzable dimethylsilanes to yield low molecular weight, low viscosity liquids which may then be polymerized by suitable methods such as alkali or acid treatments to liquids having on the average more than 10 silicon atoms per molecule. The products of hydrolysis and polymerization comprise either cyclic polymers or chain polymers or mixtures thereof. The chain polymers may be terminated by hydroxyl groups, residual chlorine or ethoxy radicals, or if desired by some nonfunctional groups such as tirmethylsiloxy, i. e., $OSi(CH_3)_3$. Many of these compositions have been found to possess low pour points, high boiling points, low viscosity-temperature coefficients, and high thermal stability.

Because of their properties the liquid dimethyl silicones having on the average more than 10 silicon atoms per molecule have been shown to be useful among other things as heat transfer media, i. e., for transmitting heat to fluids in indirect contact therewith. They are particularly useful in those applications where the media must operate at elevated temperatures since they can withstand temperatures above 200° C. for hours without gelation. However, for many applications the period of operation at the high temperatures is such that even these dimethyl silicone fluids will increase in viscosity and finally gel. Accordingly, it would be desirable to improve the resistance to gelation at elevated temperatures of these liquid dimethyl silicones without, at the same time, seriously affecting their other properties.

The primary object of this invention is to provide organosilicon compositions comprising liquid dimethyl silicones having on the average more than 10 silicon atoms per molecule which shall have improved thermal stability.

Other objects and advantages of the present invention will become apparent upon reference to the following description and examples.

In accordance with my invention, I have discovered that the thermal stability of a liquid dimethyl silicone having on the average more than 10 silicon atoms per molecule can be improved by the addition thereto of a minor proportion (i. e. less than 50 per cent by weight) of an organo-siloxane having on the average less than six silicon atoms per molecule, each of the silicon atoms having at least two hydrocarbon radicals attached thereto and said hydrocarbon radicals consisting of both phenyl and methyl radicals. Examples of such siloxanes are those having the generic formulae, $(R_2SiO)_x$,

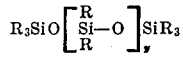

and $R_3Si—O—SiR_3$ where in each case some of the R's are methyl and some are phenyl radicals; $x$ has a value less than six and $y$ has a value less than four. Low molecular weight chain siloxane polymers may also be used so long as they meet the above specifications. If desired, mixtures of the several specified siloxanes may likewise be used, such mixtures being formed in many instances as a result of hydrolysis of mixtures of the silanes.

In general, I prefer to use as a stabilizing additive those phenyl and methyl substituted siloxanes meeting the above specifications and the further requirements that there be on the average at least 0.5 phenyl radicals per silicon atom and the ratio of number of phenyl radicals to number of methyl radicals be not greater than one.

The resulting mixtures of silicone and additives, when the latter are present in minor proportion (i. e. less than 50 per cent by weight) are eminently adapted for use as heat transfer media. Many of them are also useful as dielectric, damping and hydraulic liquids.

For a better understanding of my invention, reference should be had to the following examples which are included for purposes of illustration and not limitation. To demonstrate the effect of the additives of my invention, an accelerated test was employed. This test involved the blowing of air at elevated temperature through the mixture of silicone and additives and comparing the effect produced with that obtained by blowing air through the silicone alone. Since it is the oxygen of the air which is in large part responsible for the changes taking place in the silicone liquids at high temperature, this test afforded a relatively quick method of determining the efficacy of the additive as a stabilizer for the silicones against gelation.

Example 1

A solution of dimethyl silicone having a viscosity of 2100 Saybolt seconds and symmetrical tetramethyldiphenyldisiloxane in the molar ratio of about 10:1 was air-blown for 6½ hours at 230° C. Even then the product had a viscosity which was less than that of the starting dimethyl silicone. The liquid dimethyl silicone alone with similar air treatment became a gel after 3 to 3½ hours at 220–230° C. It was also found that the addition of phenyldimethylethoxysilane to the liquid dimethyl silicone improved its resistance to gelation. Presumably the ethoxy silane was converted to the disiloxane by the oxidation of the ethoxy radical.

*Example 2*

A liquid dimethyl silicone having a viscosity of 100 centistokes at 25° C. gelled in 8½ hours when air was bubbled through it at 250° C. When 10 per cent by weight of symmetrical tetramethyldiphenyldisiloxane, $[(C_6H_5)(CH_3)_2Si]_2O$, was added, gelation occurred under the same conditions, only after 22¼ hours. With 20 per cent of the disiloxane, gelation occurred in 60 hours.

*Example 3*

A mixture of the liquid dimethyl silicone of Example 2 and 10 per cent by weight of unsymmetrical tetramethyldiphenyldisiloxane $(C_6H_5)_2(CH_3)Si—O—Si(CH_3)_3$ gelled only after 28¾ hours of air-blowing at 250° C.

*Example 4*

A liquid dimethyl silicone having a viscosity of 12,000 centistokes at 25° C. gelled in 2½ hours after being blown with air at 250° C. When 30 per cent by weight of symmetrical tetramethyldiphenyldisiloxane was added, this gelation time was extended to 31 hours. When 40 per cent by weight of the disiloxane was added, the gelation time was 85 hours.

*Example 5*

A liquid dimethyl silicone having a viscosity of 1150 centistokes at 25° C. gelled when air blown at 250° C. for 4½ hours. As a result of the addition of 10 per cent by weight of symmetrical dimethyltetraphenyldisiloxane, the time required to cause gelation under the same conditions was extended to 9½ hours. A similarly extended gelation time is obtained by the addition of methyldiphenylethoxysilane.

*Example 6*

A copolymeric organosiloxane was prepared comprising substantially entirely cyclic copolymers consisting of phenylmethylsiloxane and dimethysiloxane units joined together through siloxane linkages in such proportions that the average number of phenyl radicals per silicon atom was .75, there being from 3 to 5 silicon atoms per molecule in the cyclic copolymers. This copolymer was added to a liquid dimethyl silicone having a viscosity of 1150 centistokes in the amount of 20 per cent by weight. The gelation time of this dimethyl silicone at 250° C. with air blowing was extended (as the result of such addition) from 4½ hours to 15 hours.

*Example 7*

A copolymeric organosiloxane similar to the one used in Example 6 was prepared having, however, on the average .67 phenyl radicals per silicon atom. This copolymer was added in the amount of 30 per cent by weight to a liquid dimethyl silicone of 102 centistokes viscosity at 25° C. and the resulting solution heated at 250° C. with air blowing therethrough. It required 52½ hours of this treatment to cause gelation to take place, in contrast to 7½ hours if no additive were present.

*Example 8*

A liquid dimethyl silicone of 52.4 centistokes viscosity comprising chain polymers with terminal trimethylsiloxy groups gelled as results of being blown with air at 250° C. for 9 hours. The addition of 10 per cent by weight of the copolymeric organosiloxane of Example 6 extended the gelation time to 22 hours; 20 per cent to 50 hours; and 30 per cent beyond 58 hours.

*Example 9*

A mixture of the liquid dimethyl silicone of Example 8 and 10 per cent by weight of a liquid methyl phenyl silicone of 414 centistokes viscosity and having on the average less than six silicon atoms per molecule gelled only after 27½ hours of air-blowing at 250° C. A corresponding result can be obtained from the addition of phenylmethyldiethoxysilane.

*Example 10*

A liquid dimethyl silicone having a viscosity of 23,400 centistokes at 25° C. gelled in 5½ hours after being blown with air at 250° C. A solution containing 80 per cent of the silicone and 20 per cent of symmetrical tetramethyldiphenyldisiloxane required 31 hours of air-blowing with the same conditions before it reached gelation.

*Example 11*

A liquid dimethyl silicone having a viscosity of 1150 centistokes at 25° C. gelled when air-blown at 250° C. for 4½ hours. As a result of the addition of 10 per cent by weight of 1,1,3-trimethyltriphenyldisiloxane $(CH_3)_2(C_6H_5)Si—O—Si(CH_3)(C_6H_5)_2$ the time required to cause gelation under the same conditions was extended to 10½ hours.

I claim:

1. A composition of matter comprising a major proportion of a liquid polymeric organo siloxane having on the average more than 10 silicon atoms per molecule, in which all the organic radicals are methyl radicals, there being at least 2 methyl radicals attached to each silicon atom, and a minor proportion in amount of at least 10 per cent by weight of an organo siloxane having on the average less than 6 silicon atoms per molecule, each silicon atom thereof having at least 2 hydrocarbon radicals attached thereto, in which latter organosiloxane the hydrocarbon radicals are both methyl and phenyl radicals.

2. A composition of matter comprising a major proportion of a liquid polymeric organo siloxane having on the average more than 10 silicon atoms per molecule, in which all the organic radicals are methyl radicals, there being at least 2 methyl radicals attached to each silicon atom, and a minor proportion in amount of at least 10 percent by weight of a phenyl and methyl hexasubstituted disiloxane.

3. A composition of matter comprising a major proportion of a liquid polymeric organo siloxane having on the average more than 10 silicon atoms per molecule, in which all the organic radicals are methyl radicals, there being at least 2 methyl radicals attached to each silicon atom, and a minor proportion in amount of at least 10 percent by weight of tetramethyldiphenyldisiloxane.

4. A composition of matter comprising a major proportion of a liquid polymeric organo siloxane having on the average more than 10 silicon atoms per molecule, in which all the organic radicals are methyl radicals, there being at least 2 methyl radicals attached to each silicon atom, and a minor proportion in amount of at least 10 percent by weight of trimethyltriphenyldisiloxane.

5. A composition of matter comprising a major proportion of a liquid polymeric organo siloxane having on the average more than 10 silicon atoms per molecule, in which all the organic radicals are methyl radicals, there being at least 2 methyl radicals attached to each silicon atom, and a minor proportion in amount of at least 10 percent by weight of cyclic organo siloxane having 3 to 5 silicon atoms per molecule, each silicon atom thereof having 2 and only 2 hydrocarbon radicals attached thereto, in which cyclic organosiloxane the hydrocarbon radicals are both methyl and phenyl radicals.

WILLIAM HERBERT DAUDT.

REFERENCES CITED

The following references are of record in the file of this patent:

UNITED STATES PATENTS

| Number | Name | Date |
| --- | --- | --- |
| 2,384,384 | McGregor et al. | Sept. 4, 1945 |